United States Patent
Ducroquet et al.

(10) Patent No.: US 10,034,425 B2
(45) Date of Patent: Jul. 31, 2018

(54) AUTOMATIC HEADER COUPLING

(71) Applicant: AGCO Corporation, Hesston, KS (US)

(72) Inventors: Frederic Ducroquet, Hesston, KS (US); Steven Tippery, Gretna, NE (US); Emmanuel Regis Magisson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 53 days.

(21) Appl. No.: 15/122,242

(22) PCT Filed: Jul. 24, 2014

(86) PCT No.: PCT/US2014/047931
§ 371 (c)(1),
(2) Date: Aug. 29, 2016

(87) PCT Pub. No.: WO2015/134055
PCT Pub. Date: Sep. 11, 2015

(65) Prior Publication Data
US 2016/0360698 A1  Dec. 15, 2016

(30) Foreign Application Priority Data

Mar. 3, 2014  (GB) .................................. 1403698.2

(51) Int. Cl.
| | |
|---|---|
| *A01B 71/06* | (2006.01) |
| *B62D 53/00* | (2006.01) |
| *B62D 59/04* | (2006.01) |
| *A01D 41/16* | (2006.01) |
| *A01D 41/14* | (2006.01) |

(52) U.S. Cl.
CPC .......... *A01D 41/16* (2013.01); *A01D 41/142* (2013.01)

(58) Field of Classification Search
CPC .... A01D 41/16; A01D 41/142; A01D 41/127; A01D 67/005; A01D 75/287; A01B 71/08; A01B 71/063; E02F 3/3604; Y10S 56/09
See application file for complete search history.

(56) References Cited

U.S. PATENT DOCUMENTS

| | | | | |
|---|---|---|---|---|
| 2,869,660 A | * | 1/1959 | Krause ..................... | B60D 7/00 180/14.4 |
| 3,324,637 A | * | 6/1967 | Windsor ................ | A01D 41/16 56/15.6 |
| 3,431,711 A | * | 3/1969 | Claas ..................... | A01D 41/12 56/14.5 |
| 4,226,391 A | | 10/1980 | Keultjes | |

(Continued)

FOREIGN PATENT DOCUMENTS

| | | |
|---|---|---|
| GB | 1105386 A | 3/1968 |
| GB | 1457480 A | 12/1976 |

OTHER PUBLICATIONS

UK Intellectual Property Office, International Search Report for related UK Application No. GB1403698.2; dated Aug. 27 2014.

(Continued)

*Primary Examiner* — Arpad Fabian-Kovacs (57) ABSTRACT

A combine harvester with a feeder house assembly, the assembly including a feeder house with an inlet end; a tilt frame surrounding the inlet end of the feeder house and in pivotal arrangement relative to the feeder house; a gearbox attached to the tilt frame; and a first dog clutch operably coupled to the gearbox.

14 Claims, 11 Drawing Sheets

(56) References Cited

U.S. PATENT DOCUMENTS

| | | | |
|---|---|---|---|
| 4,266,395 A * | 5/1981 | Basham | A01D 75/287 |
| | | | 56/16.2 |
| 4,738,463 A | 4/1988 | Poore et al. | |
| 6,116,008 A | 9/2000 | Digman et al. | |
| 6,312,329 B1 | 11/2001 | Digman et al. | |
| 6,519,923 B1 | 2/2003 | Cooksey et al. | |
| 6,735,929 B2 * | 5/2004 | Watts | A01B 71/06 |
| | | | 56/14.9 |
| 7,234,291 B2 | 6/2007 | Rickert | |
| 7,497,459 B2 * | 3/2009 | Johnson | A01D 41/16 |
| | | | 280/515 |
| 7,552,578 B2 | 6/2009 | Guske | |
| 8,079,204 B2 | 12/2011 | Coers et al. | |
| 8,631,634 B2 | 1/2014 | Vereecke et al. | |
| 8,973,344 B2 * | 3/2015 | Ritter | A01B 71/063 |
| | | | 56/15.3 |
| 9,043,954 B2 * | 6/2015 | Ritter | A01B 71/063 |
| 9,137,946 B2 * | 9/2015 | Verhaeghe | A01D 41/16 |
| 9,717,181 B2 * | 8/2017 | Boyd, III | A01D 41/16 |
| 9,723,785 B2 * | 8/2017 | Ritter | A01D 41/16 |
| 9,743,588 B2 * | 8/2017 | Dreer | A01D 67/005 |
| 2002/0005033 A1 | 1/2002 | Uhlending et al. | |
| 2004/0163374 A1 | 8/2004 | Rickert | |
| 2004/0187461 A1 * | 9/2004 | Rickert | A01D 69/00 |
| | | | 56/14.2 |
| 2008/0006014 A1 | 1/2008 | Guske | |
| 2008/0256914 A1 | 10/2008 | Ricketts et al. | |
| 2008/0271425 A1 * | 11/2008 | Ricketts | A01D 41/16 |
| | | | 56/15.6 |
| 2012/0102905 A1 | 5/2012 | Dold et al. | |
| 2012/0317951 A1 * | 12/2012 | Vereecke | A01D 41/16 |
| | | | 56/14.9 |
| 2013/0219847 A1 | 8/2013 | Miller et al. | |
| 2015/0373910 A1 * | 12/2015 | Surmann | A01D 69/06 |
| | | | 56/14.5 |
| 2016/0057934 A1 * | 3/2016 | Dreer | A01D 41/142 |
| | | | 56/13.5 |
| 2016/0278276 A1 * | 9/2016 | De Coninck | A01B 63/004 |

OTHER PUBLICATIONS

European Patent Office, International Search Report for International Parent Application No. PCT/US2014/047931, dated Oct. 20, 2014.

* cited by examiner

AUTOMATIC HEADER COUPLING

TECHNICAL FIELD

The present disclosure is generally related to agriculture technology, and, more particularly, combine harvesters.

BACKGROUND

Combine harvesters headers are very wide, and are not compatible with circulation on most roads. The most common method to transport the header from field to field is to detach the header from the combine harvester and use a trailer to transport the header. Attaching and detaching the header takes time, and the operator needs to leave the combine harvester cab several times to complete the operations. Further, attaching and detaching the header is often a messy job, with hydraulic fluids, dust, etc. involved in causing the grimy conditions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a combine harvester feeder house assembly, comprising: a feeder house comprising an inlet end; a tilt frame surrounding the inlet end and in pivotal arrangement relative to the feeder house; a gearbox attached to the tilt frame; and a first dog clutch operably coupled to the gearbox.

DETAILED DESCRIPTION

Certain embodiments of an automatic header coupler system and method are disclosed that save time during header attaching and detaching operations for a combine harvester, allow for the operator to remain in a cab of the combine harvester during such operations in many cases, and provides backwards compatibility for legacy attach and detach systems (e.g., old-style headers with U-joint shafts). In one embodiment, a drive connection (e.g., for mechanical coupling) is disposed between a tilt frame of a feeder house of the combine harvester and a shaft of the header, the drive connection comprising a dog clutch that is powered by an electrically or hydraulically powered ram sub-assembly. In some embodiments, electrical and/or hydraulic connections between the tilt frame and the header are achieved using a rapid or quick connection assembly (herein, also referred to as a quick connect apparatus). Hereinafter, electrical and/or hydraulic connections are referred to as simply hydraulic connections or the like (e.g., hydraulic coupling, hydraulic coupling mechanisms, etc.) for brevity, with the understanding that in some embodiments, both electrical and hydraulic connections and/or mechanisms, etc. may be implemented in some embodiments. The hydraulic connections are likewise ram-actuated using the same, or in some embodiments, a different ram sub-assembly. These and/or other features are described further below, and enable automatic header coupling (e.g., without any person having to physically make the aforementioned connections at the locale of those connections).

Digressing briefly, since introducing quick attach headers in the 1960s, the ease in which headers are attached and detached to and from combine harvesters has improved by providing a centralized location where the operator may reach all necessary levers and drives. For instance, a drive dog clutch requiring a king pin to install was located on the left side of the feeder house (or in some cases, both sides), the hydraulics on the right side, and the process of locking the header to the feeder required four (4) pins (e.g., two (2) on each side). In the 1970s, at least one manufacturer of combine harvesters offered a device that enabled locking the header to the feeder house and pushing a dog clutch using a single hand lever actuated from the ground. In many of today's combine harvesters, the drive U-joints, the lever to lock the header (e.g., no more pins), and the fast coupling hydraulic system are on the left side of the feeder house, yet the three (3) operations associated with these mechanisms still need to be done by hand in what often proves to be a rather dirty and/or generally uncomfortable endeavor for the operator (or any other person there to assist the operator). Indeed, for larger headers using left and right-side drive connections, the area covered by the operator is increased, as is the time consumed in performing these operations. In contrast, certain embodiments of an automatic header coupler system, for reasons that are to be clear in the description below, save time during the process of header attachment and/or removal, including reducing the amount of time the operator is out of the cab and/or enabling the operator to avoid some of the less desirable tasks associated with these operations.

Having summarized certain features of automatic header coupler systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a combine harvester having a transverse-rotor design, though it should be appreciated within the context of the present disclosure that combine harvesters of other designs, such as hybrid, conventional, axial, or dual axial, may be used and hence are contemplated to be within the scope of the present disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly.

Figure 1:
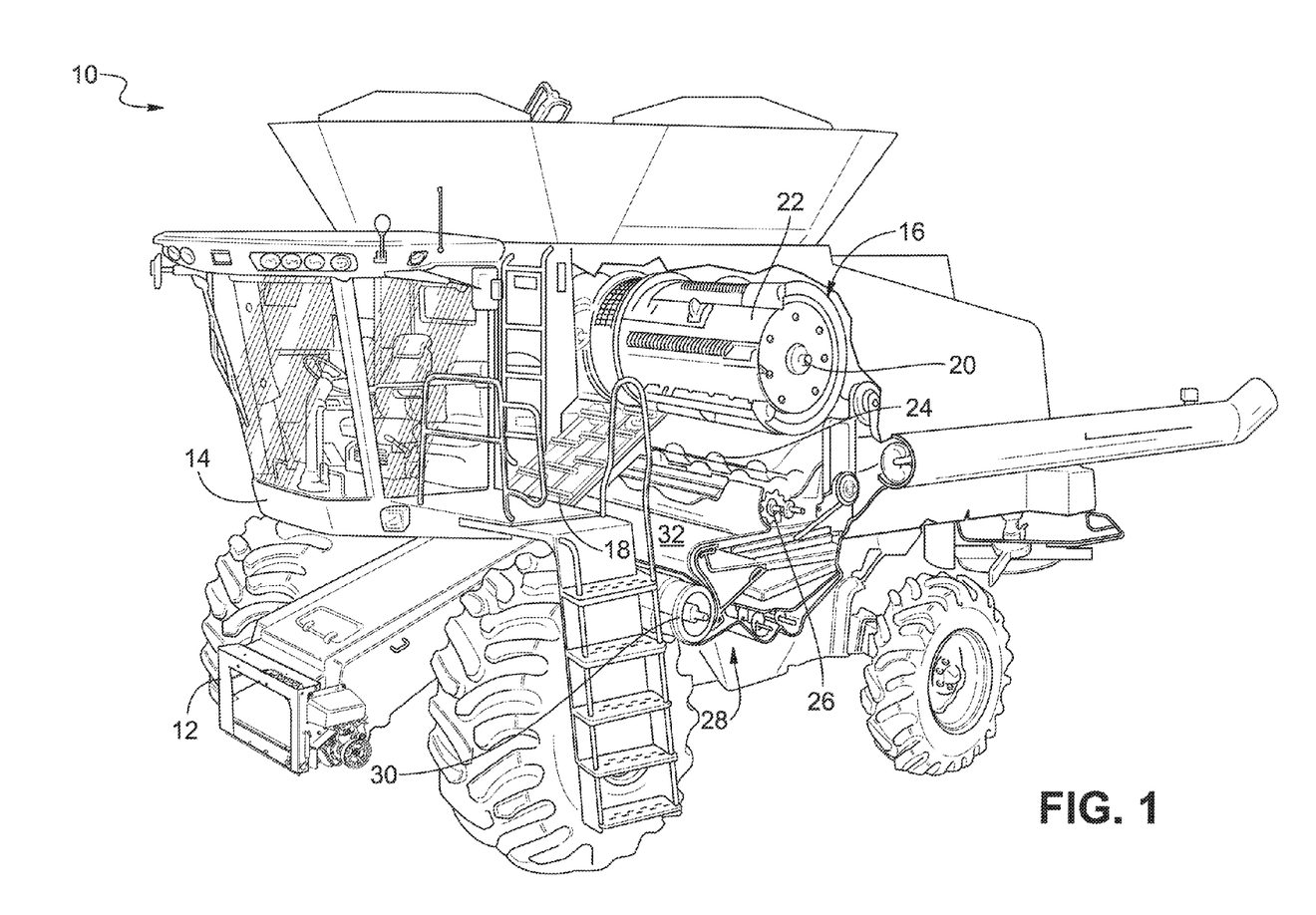
FIG. 1 is a schematic diagram, in partial cutaway view, of an example combine harvester showing an embodiment of an automatic header coupler system.

Referring now to FIG. 1, shown is an example combine harvester 10 in which an embodiment of an automatic header coupler system may be implemented. It should be understood by one having ordinary skill in the art, in the context of the present disclosure, that the example combine harvester 10 shown in FIG. 1 is merely illustrative, and that other combine configurations may be implemented in some embodiments. The example combine harvester 10 is shown in FIG. 1 without a header, and from front to back, comprises a feeder house 12 and an operator cab 14, followed by a processing compartment that includes a processing apparatus 16. In operation, the combine harvester 10 includes a harvesting header (shown in FIG. 2, as described below) at the front of the machine that cuts crop materials and delivers the cut crop materials to the front or inlet end of the feeder house 12. Such crop materials are moved upwardly and rearwardly within and beyond the feeder house 12 by a conveyor 18 until reaching the processing apparatus 16. In the depicted example, the processing apparatus 16 comprises a single, transverse rotor 20 (e.g., such as that found in a Gleaner® Super Series Combine by AGCO), and a rotor cage 22 surrounding the rotor 20. The rotor cage 22 comprises well-known foraminous processing members in the form of threshing concave assemblies and separator grate assemblies. In the processing apparatus 16, well-known threshing and separating operations are performed. For instance, bulkier stalk and leaf materials are generally retained by the concave assemblies and the grate assemblies, and are discharged out from the processing apparatus 16 and ultimately out of the rear of the combine harvester 10. Grain (and possibly light chaff) escapes through the concave assemblies and the grate assemblies of the processing apparatus 16, and is discharged onto one or more distribution augers 24, with the resultant distributed crop material provided to one or more accelerator rolls 26. The crop material is propelled from the accelerator rolls 26, and enters a cleaning system 28 comprising a shoe assembly. The shoe assembly comprises a cascade pan, which is impacted by the crop material propelled from the accelerator rolls 26, as well as plural stacked oscillating sieve assemblies that receive the crop material from the cascade pan and convey the crop material rearward. A fan 30 provides air through upper and lower ducts 32 to assist the oscillating mechanisms of the shoe assembly in conveying the chaff flow to the rear of the combine harvester 10. The cleaned grain that drops to the bottom of the cleaning system 28 is delivered by an auger that transports the grain to a well-known elevator mechanism (not shown), which conveys the grain to a grain bin located at the top of the combine harvester 10. Any remaining chaff and partially or unthreshed grain is recirculated through the processing apparatus 16 via a tailings return auger. As combine processing is known to those having ordinary skill in the art, further discussion of the same is omitted here for brevity.

Figure 2:
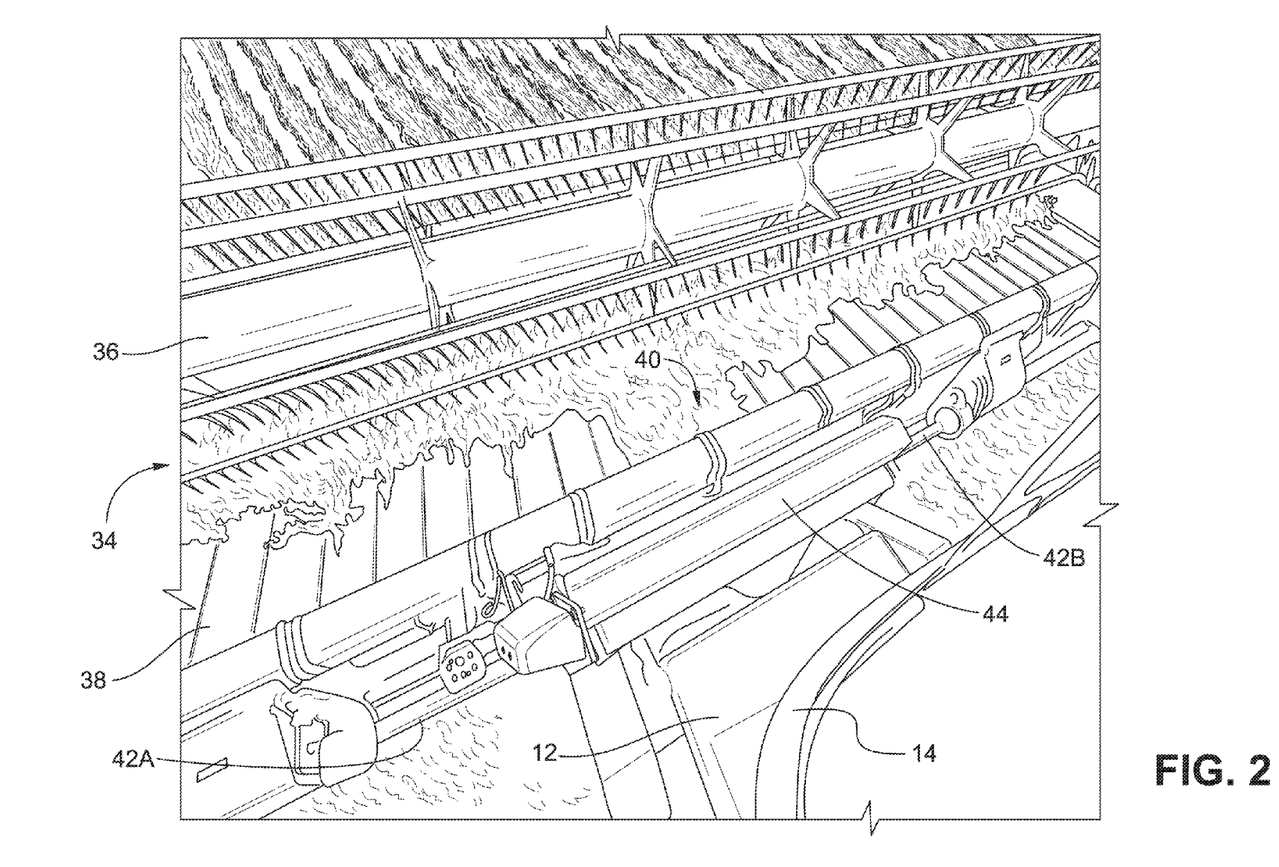
FIG. 2 is a schematic diagram in a top front perspective view of an example combine harvester showing a header with shafts coupled to opposing sides of a tilt frame of a feeder house for an embodiment of an automatic header coupler system.

FIG. 2 shows a top-down view from a location proximal to the top of the operator cab 14 of the combine harvester 10 of FIG. 1. As shown, the feeder house 12 has secured to it a header 34, shown partially in FIG. 2, which may be removed and replaced with other types of headers depending on the application. Although shown as a draper style header, other types of headers may be used, such as pickup headers, corn headers, etc. In one embodiment, the header 34 comprises a cutting portion 36 for cutting the crops and a transition portion 38 that conveys (e.g., using a conveyor, such as a belt or belts, chain and slat configuration, etc.) the cut crops toward a rear, center portion 40 of the header 34, as is known. The center portion 40 may comprise a feeder auger (not shown) to advance the harvested crop material toward the inlet of the feeder house 12, where the conveyor 18 (FIG. 1) conveys the crop material toward the processing apparatus 16 (FIG. 1).

Evident from FIG. 2 is that header shafts 42 (e.g., left header shaft 42A and right header shaft 42B) are operably coupled to a tilt frame 44 of the feeder house 12, and not directly to the feeder house 12 itself, which is in contrast to today's manner of attachment.

Figure 3:
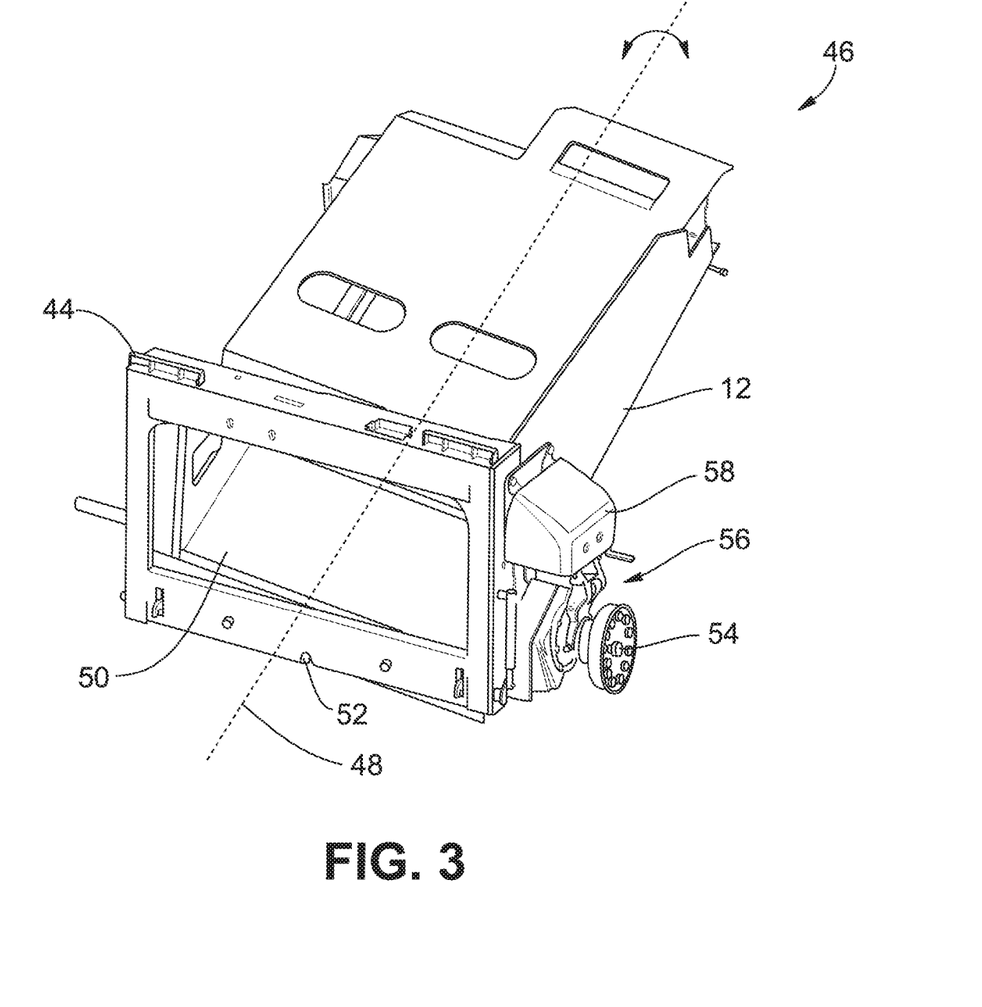
FIG. 3 is a schematic diagram in overhead front perspective view showing an embodiment of a combine harvester feeder house assembly for an embodiment of an automatic header coupler system.

Referring now to FIG. 3, shown is an embodiment of automatic header coupler system comprising a combine harvester feeder house assembly 46 (hereinafter, also referred to simply as a feeder house assembly for brevity). It should be appreciated within the context of the present disclosure that some embodiments may include additional components or fewer or different components, and that the example depicted in FIG. 3 is merely illustrative of one embodiment among others. The feeder house assembly 46 is equipped for automated (and in some embodiments, manual) mechanical and hydraulic connections between the tilt frame 44 of the feeder house 12 and the header 34 (FIG. 2). The feeder house assembly 46 comprises the feeder house 12, which comprises a longitudinal axis 48 and an inlet end 50 where harvested crop material enters the combine harvester 10 (FIG. 1) from the header 34. The feeder house assembly 46 also comprises the tilt frame 44, which is adjacent the inlet end 50 and surrounds a front portion of the feeder house 12. The tilt frame 44 is arranged in pivotal arrangement (e.g., with the ability to roll relative to the center, longitudinal axis 48, as denoted by the double arrow symbol) relative to the feeder house 12, as is known. In one embodiment, a pivot point 52 and a cylinder (not shown, but typically at the top portion of the tilt frame 44) that is coupled between the tilt frame 44 and the feeder house 12 collectively enable the pivotal capability, though some embodiments may locate the pivot point in different and/or additional locations. The feeder house 12 and the tilt frame 44 that is pivotally attached to the feeder house 12 are moveable in upwards and downwards directions due to one or more hydraulic cylinders (not shown) located beneath the feeder house 12 and coupled to the frame of the combine harvester 10, as is known. The upwards and downwards movement of the feeder house 12 and the tilt frame 44 through attachment to the feeder house 12 enables the header 34 to be raised and lowered, which enables the operator (through manipulation of machine controls via a user interface in the cab 14 (FIG. 1) or elsewhere) to lift a top lip of the tilt frame 44 underneath a top edge of the header 34 to commence attachment operations of the header 34 to the feeder house 12 (and similarly, the detachment through lowering in a reversal of operations). The tilt frame rotation relative to the feeder house 12 enables alignment of mechanical and hydraulic connections in collaboration with the upward and downward and fore and aft movement of the feeder house 12 and combine harvester 10, respectively.

The feeder house assembly 46 also comprises a dog clutch 54 that enables a mechanical connection to the header 34 (FIG. 2), and in one embodiment, a ram sub-assembly 56 that enables transverse movement of the dog clutch 54 and a hydraulic coupler (obscured from view) to engage corresponding mating features of the header 34, as described further below. Also shown is a hingeable dust cover 58, which pivotally opens to enable rapid coupling of the hydraulic coupler of the feeder house assembly 46 to the header 34, while providing protection from the elements (e.g., dust, dirt, etc.) when in the closed-position. Importantly, the mechanical coupling mechanisms (e.g., the dog clutch 54) and at least a portion of the hydraulic coupler mechanisms of the feeder house assembly 46 move with the tilt frame 44 even when the tilt frame 44 does not move in correspondence with the feeder house 12. In contrast, conventional header coupling systems comprise movements that are dependent only on the feeder house movements.

Figure 4:
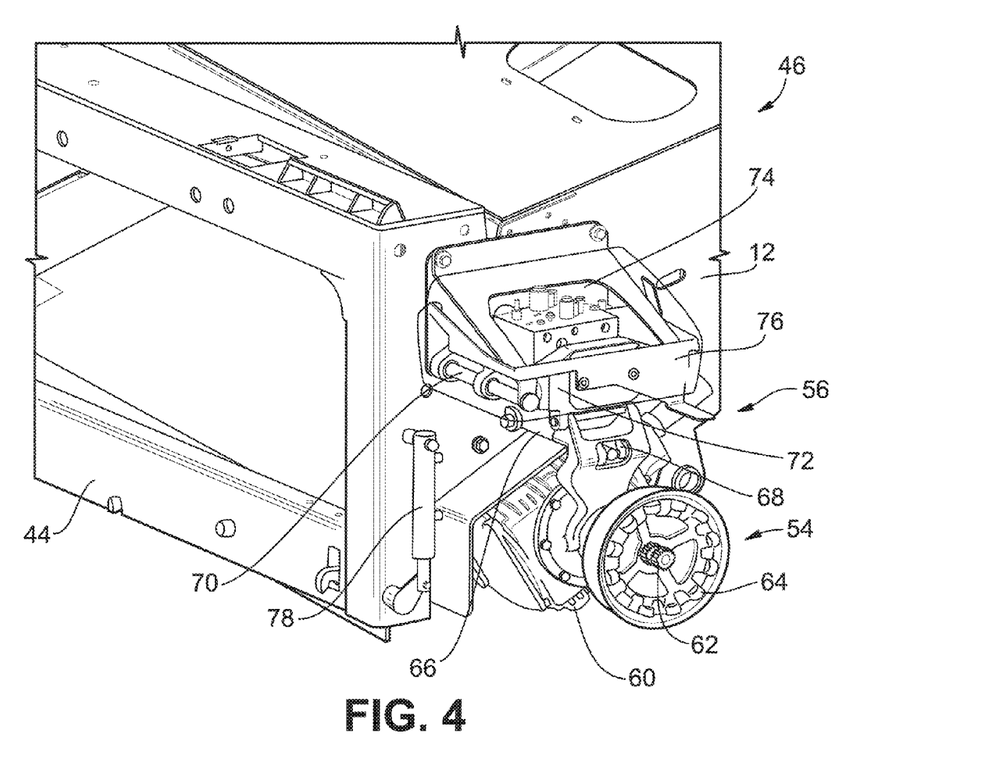
FIG. 4 is a schematic diagram in front perspective view showing an embodiment of a combine harvester feeder house assembly for an embodiment of an automatic header coupler system.

Referring now to FIG. 4, shown is a closer view of the feeder house assembly 46 shown in FIG. 3. It should be appreciated within the context of the present disclosure that some embodiments may include additional components or fewer or different components, and that the example depicted in FIG. 4 is merely illustrative of one embodiment among others. For instance, though mechanical and hydraulic coupling mechanisms are depicted on the portion of the tilt frame 44 that is on the left side of the feeder house 12, some embodiments may use all or part of these components on the right side portion of the tilt frame 44, or on both sides, in some embodiments. The feeder house assembly 46 comprises the feeder house 12, and the tilt frame 44 as described above. The feeder house assembly 46 also comprises mechanical and hydraulic apparatuses pertinent to automated connections to the header 34 (FIG. 2) that are moveable along all axes with the tilt frame 44. As noted above, the rotational movement of the tilt frame 44 is independent of the movement along at least one axis of the feeder house 12, the latter lacking machine-independent rotational movement. The feeder house assembly 46 comprises, beginning at the lower left side of the tilt frame 44, the dog clutch 54. The dog clutch 54 is directly and operably coupled to a gearbox 60 that is attached (e.g., directly) to the tilt frame 44. The gearbox 60 enables rotational motion of a transverse shaft running through the feeder house 12 and directly (or in some embodiments, indirectly) coupled to the dog clutch 54. The dog clutch 54 comprises a spline joint 62 that enables mating of the splines with grooves of a receiving joint (e.g., U-joint) of a shaft of the header 34. The dog clutch 54 also comprises interference members 64 (e.g., twelve (12) shown, though some embodiments may use different quantities), which enable an interference fit with the shaft 42 (e.g., 42A, FIG. 2), which in some embodiments lacks a U-joint, of the header 34. In other words, the dog clutch 54 comprises backwards compatibility with older-style headers, as well as newer-style headers.

Also shown as part of the feeder house assembly 46 is the ram sub-assembly 56. In one embodiment, the ram sub-assembly 56 comprises a cylinder 66 (e.g., partially obscured from view), a bracket 68 directly coupled to the cylinder 66, and a linear guide assembly 70. The bracket 68 is directly coupled to an outer sleeve of the dog clutch 54, to a quick connect apparatus 72, and to the cylinder 66, which may be electrically or hydraulically powered via an associated actuator (e.g., configured, for instance in the case of the cylinder 66, as a valve located on the machine). The cylinder 66 causes (through the commonly attached bracket 68) transverse movement to both the quick connect apparatus 72 and the dog clutch 54 to enable automatic and secure engagement with hydraulic and mechanical components of the header 34 (FIG. 2), respectively. The quick connect apparatus 72 is depicted in FIG. 4 as directly coupled to (e.g., integrated with, or connected via appropriate conduit) a hydraulic apparatus 74, which comprises an actuator (e.g., solenoid). The quick connect apparatus 72 and the hydraulic apparatus 74 are housed within a frame 76, which has the pivotal cover 58 (FIG. 3) attached thereto (not shown in FIG. 4). In some embodiments, the hydraulic apparatus 74 may be located remotely from the quick connect apparatus 72, coupled through one or more conduits (e.g., wiring, tubing, etc.). The quick connect apparatus 72 is slidably coupled to the linear guide assembly 70. In one embodiment, the linear guide assembly 70 comprises cylindrical guide rods (one shown in FIG. 4) that are partially surrounded by door-hinge-like structural portions of the quick connect apparatus 72 that are attached on one end to the tilt frame 44, enabling a sliding movement of the quick connect apparatus 72 in the transverse direction along the guide rods. In some embodiments, other configurations may be used in place of the cylindrical guide rods (e.g., more rectangular or other geometrical configurations) to enable linear, transverse motion of the quick connect apparatus 72 in transverse directions. The quick connect apparatus 72 comprises ports that mate with corresponding connection features of a hydraulic coupler apparatus on the header 34. Likewise, the dog clutch 54 comprises features that mate with corresponding features of a shaft of the header 34, as described above.

In one example operation, to align the dog clutch 54 with a shaft of the header 34 (FIG. 2), the feeder house 12 and tilt frame 44 are aligned to the header 34 and associated shaft (e.g., as controlled from the cab 14 (FIG. 1) of the combine harvester 10 (FIG. 1)). To achieve the header-to-feeder house mechanical and hydraulic coupling connections, the cylinder 66 is actuated (e.g., via direct or indirect control by a controller, as prompted by an operator activating the coupling mechanisms from the cab 14), causing the cylinder 66 to push the bracket 68 outward (e.g., away from the tilt frame 44). The bracket 68, through its attachment to the dog clutch 54 and the quick connect apparatus 72, causes a concomitant outward motion of the dog clutch 54 and the quick connect apparatus 72. The quick connect apparatus 72 slides along the rods of the linear guide assembly 70. The result of the transverse movement of the dog clutch 54 and the quick connect apparatus 72 is an automated coupling to a shaft of the header 34 and to a hydraulic coupler of the header 34.

The feeder house assembly 46 also comprises a table locking cylinder 78 disposed on the left side (though not limited to that location) of the feeder house 12, and in particular, attached to the tilt frame 44. The table locking cylinder 78 may be electrically or hydraulically powered, and actuated by the operator from within the cab 14 (FIG. 1) of the combine harvester 10 (FIG. 1). The table locking cylinder 78 locks the table of the feeder house 12, maintaining a tight relationship between the tilt frame 44 and a mating face of the table (e.g., and hence, maintaining shaft alignments, regardless of the terrain).

It should be appreciated within the context of the present disclosure that variations to the above-described feeder house assembly 46 may also implemented. For instance, in one embodiment, the dog clutch 54 and the quick connect apparatus 72 may be driven in the transverse direction independently (e.g., by separate and dedicated cylinders 66, and no bracket 68). In some embodiments, for instance where the mechanical coupling features of the feeder house assembly 46 are duplicated on the right side of the tilt frame 44 in conjunction with the feeder house assembly 46 on the left side of the tilt frame 44, the dog clutch 54 may be driven by a single cylinder, similar to cylinder 66, with no hydraulic coupling needed on the right side and also no bracket 68 needed.

Figure 5:
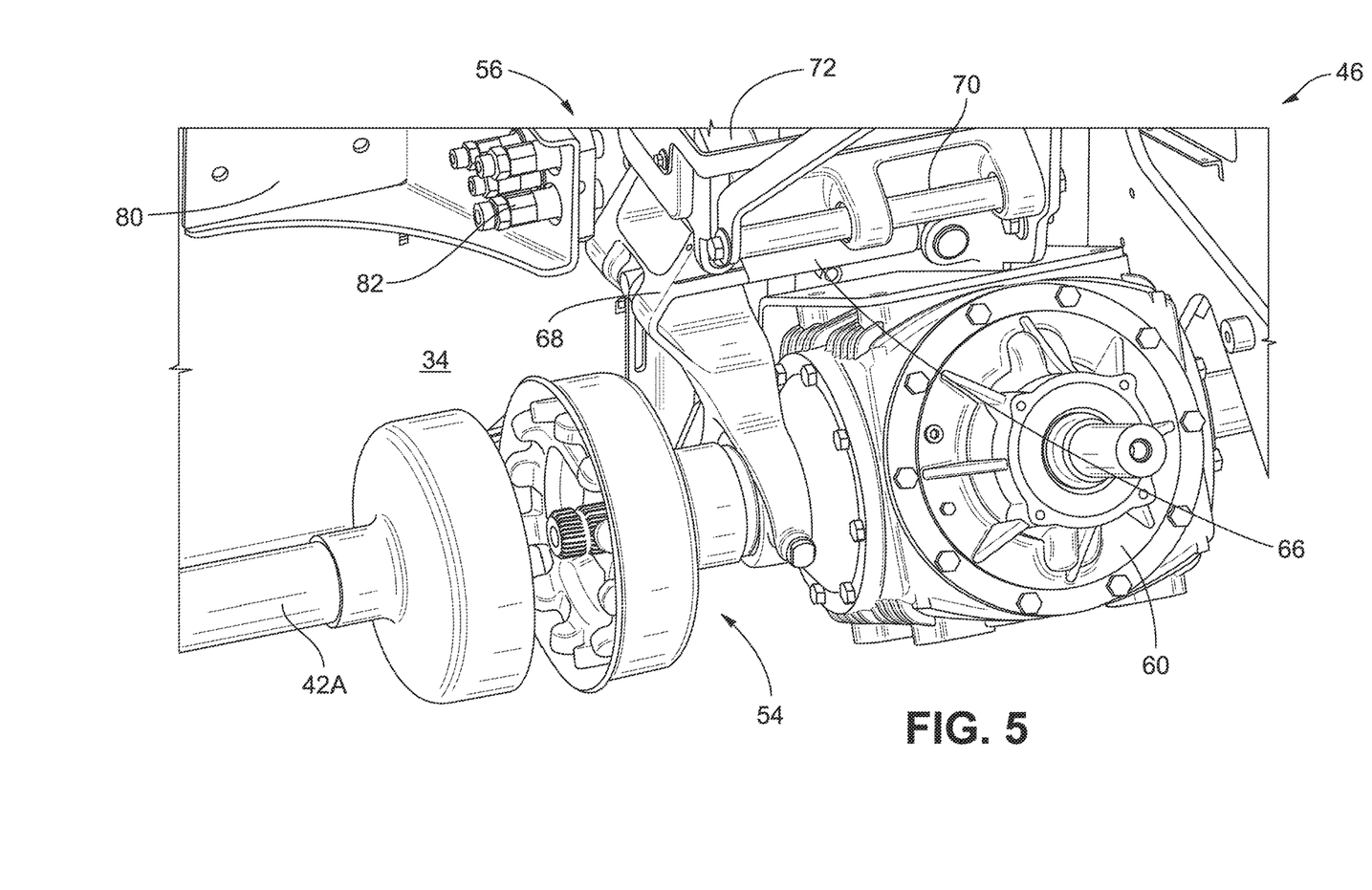
FIG. 5 is a schematic diagram in front, close-up perspective view showing an example mechanical coupling between a shaft of a header and a dog clutch of an embodiment of a combine harvester feeder house assembly for an embodiment of an automatic header coupler system.

Attention is now directed to FIG. 5, which shows a portion of the feeder house assembly 46 of FIG. 4, and certain features of the header 34 to which the feeder house assembly 46 is to engage. In particular, the feeder house assembly 46 comprises, from the bottom-up in FIG. 5, the gearbox 60, the dog clutch 54 coupled to the gearbox 60, and the ram sub-assembly 56 comprising the bracket 68, cylinder 66, and linear guide assembly 70. Also shown is the header 34, which includes the shaft 42A, and a header bracket 80 and quick connectors 82. The quick connectors 82 may carry hydraulic fluid and electricity. On the left side of the header bracket 80 looking at FIG. 5, various conduit (e.g., wiring, tubing, etc., not shown) may be connected between the quick connectors 82 and various known devices requiring hydraulic fluid and electrical power on the header 34. Looking at the right side of the bracket 80, the quick connect 72, upon outward transverse movement as actuated by the cylinder 66, engages with suitable mating features of the quick connectors 82. The cylinder 66 also causes, by translation of motion through the connected bracket 68, connection between the dog clutch 54 and the shaft 42A.

Figure 6:
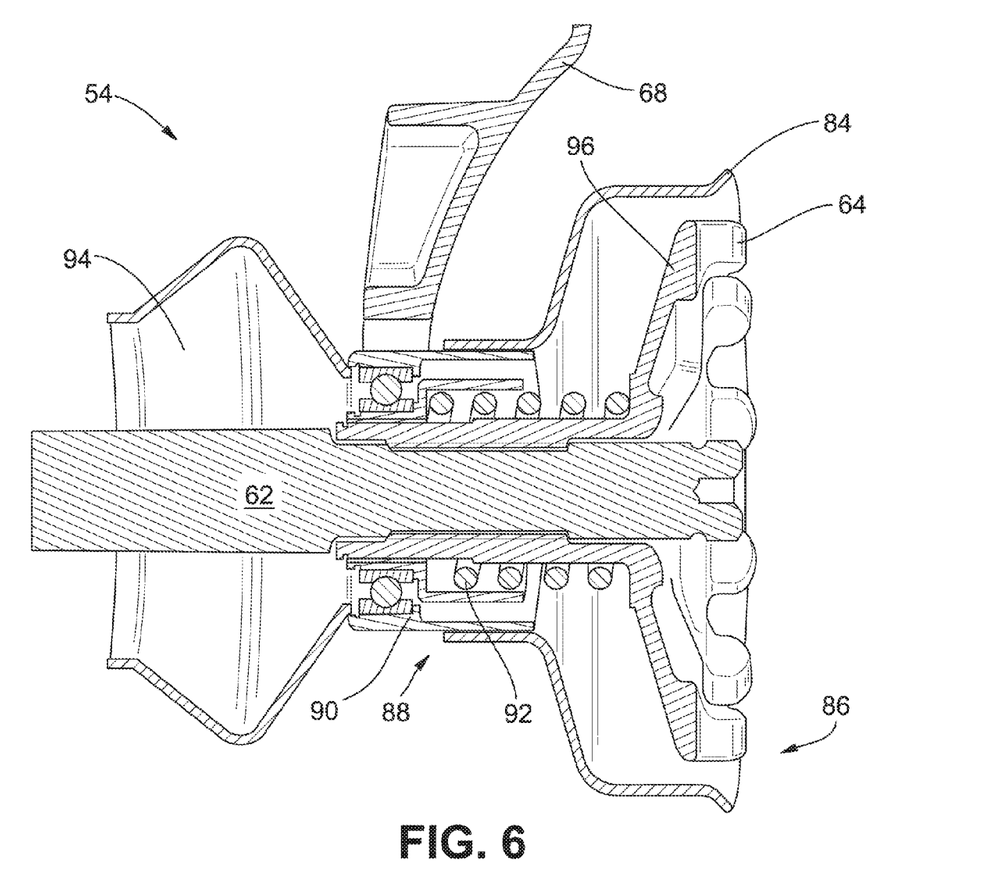
FIG. 6 is a schematic diagram in cut-away, side elevation view a dog clutch of an embodiment of a combine harvester feeder house assembly for an embodiment of an automatic header coupler system.

With reference to FIG. 6, shown in cut-away view is the dog clutch 54. The dog clutch 54 comprises a cup-shaped shield 84, with a wider diameter open face 86 that engages in a circumferential fit with a smaller diameter shield of the shaft 42 (e.g., 42A, FIG. 5). The shield 84 comprises, on an opposing end to the open face 86, a smaller diameter opening 88 that receives a sleeve 90 of the dog clutch 54. The sleeve 90 is directly coupled to the bracket 68 of the ram sub-assembly 56 (FIG. 5). In one embodiment, the dog clutch 54 comprises an optional spring 92 that facilitates retracting (or in some embodiments, extending) in the transverse direction upon detachment of the dog clutch 54 from the shaft 42 of the header 34, enabling a high reverse torque in some applications. A gearbox connector 94 facilitates connection to the gearbox 60 (FIG. 5), which may comprise a flanged connection among other well-known mechanisms of attachment. The dog clutch 54 also comprises the spline joint 62 running through the central axis of the dog clutch 54, and a disc 96 that surrounds the spline joint 62 and comprises the interference members 64 radially disposed along the edge of the disc 96 and adjacent the open face 86.

Figure 7:
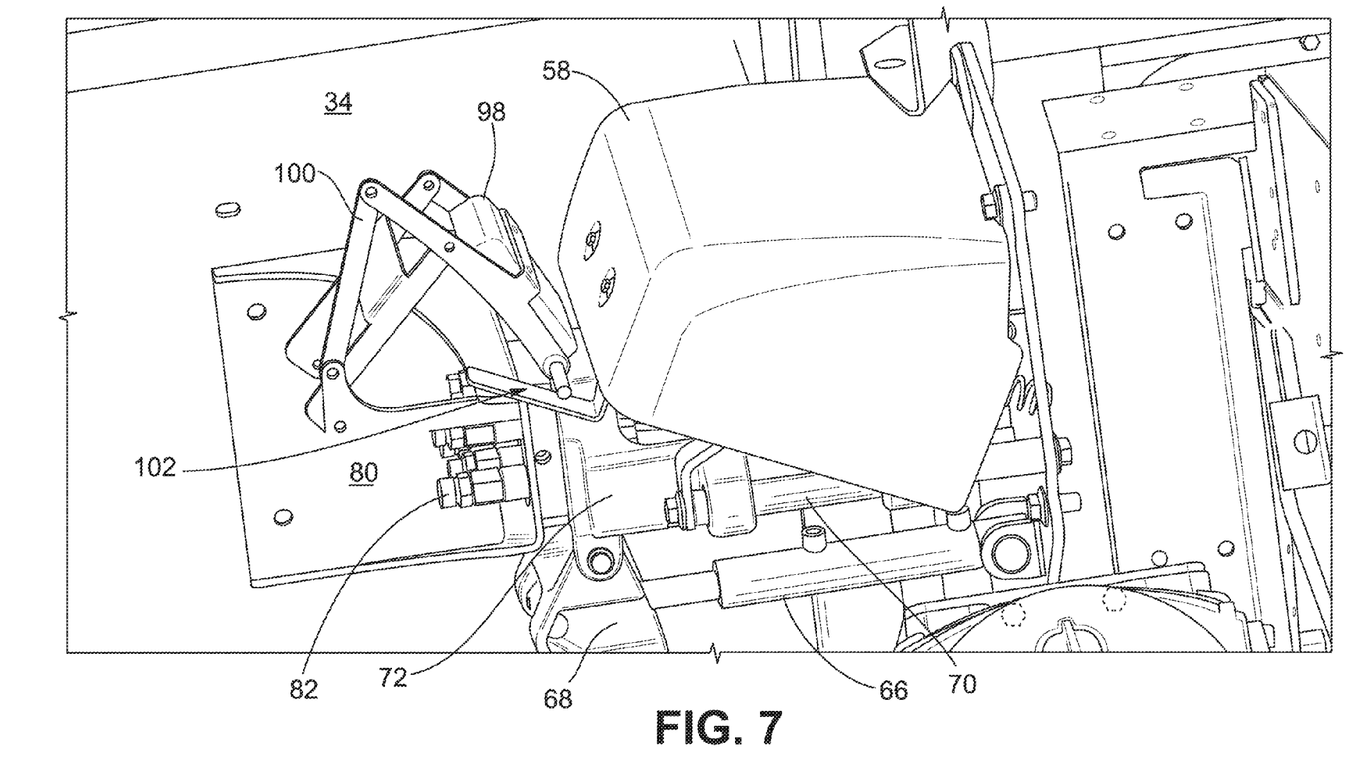
FIG. 7 is a schematic diagram in front, close-up perspective view showing a pivotally-covered quick connect apparatus and ram sub-assembly of an embodiment of a combine harvester feeder house assembly initiating hydraulic coupling to a header in an embodiment of an automatic header coupler system.

Directing attention now to FIG. 7, shown in overhead perspective view is an illustration of the hydraulic coupling between the quick connect apparatus 72 and the quick connectors 82, which reveal at least one benefit of fewer hoses or other conduit between the combine harvester 10 (FIG. 1) and the header 34. The header 34 comprises the header bracket 80, with the quick connectors 82 of the header 34 secured thereto. In some embodiments, the header bracket 80 may be adjustable to permit adaptable alignment. Also attached to the header bracket 80 is a cover 98. The cover 98 provides a shelter from the elements for the quick connectors 82 of the header 34. The cover 98 is directly coupled to hingeable members 100, enabling the cover 98 to be hingeably opened (and closed). For instance, as to opening of the cover 98, when the cover 58 for the quick connect 72 and electrical/hydraulic apparatus 74 (e.g., valve, FIG. 4) is pivotally opened through interference with internal components covered by the cover 58 as the cylinder 66 moves outward, a respective portion of the cover 58 and the cover 98 of the header 34 engage at a cover-to-cover engagement location 102, enabling the opening of the cover 98 of the header 34. Also noted from FIG. 7 is the secure engagement of the quick connect apparatus 72 with the quick connectors 82 by virtue of the cylinder 66 pushing the bracket 68, which in turn moves the attached quick connect apparatus 72 along the linear guide assembly 70 outward to couple to the quick connects 82 of the header 34. Note that some embodiments may omit the covers 98 and/or 58, and some embodiments may use other covering mechanisms to ensure protection from dust and/or other environmental and/or machine conditions.

Figure 8:
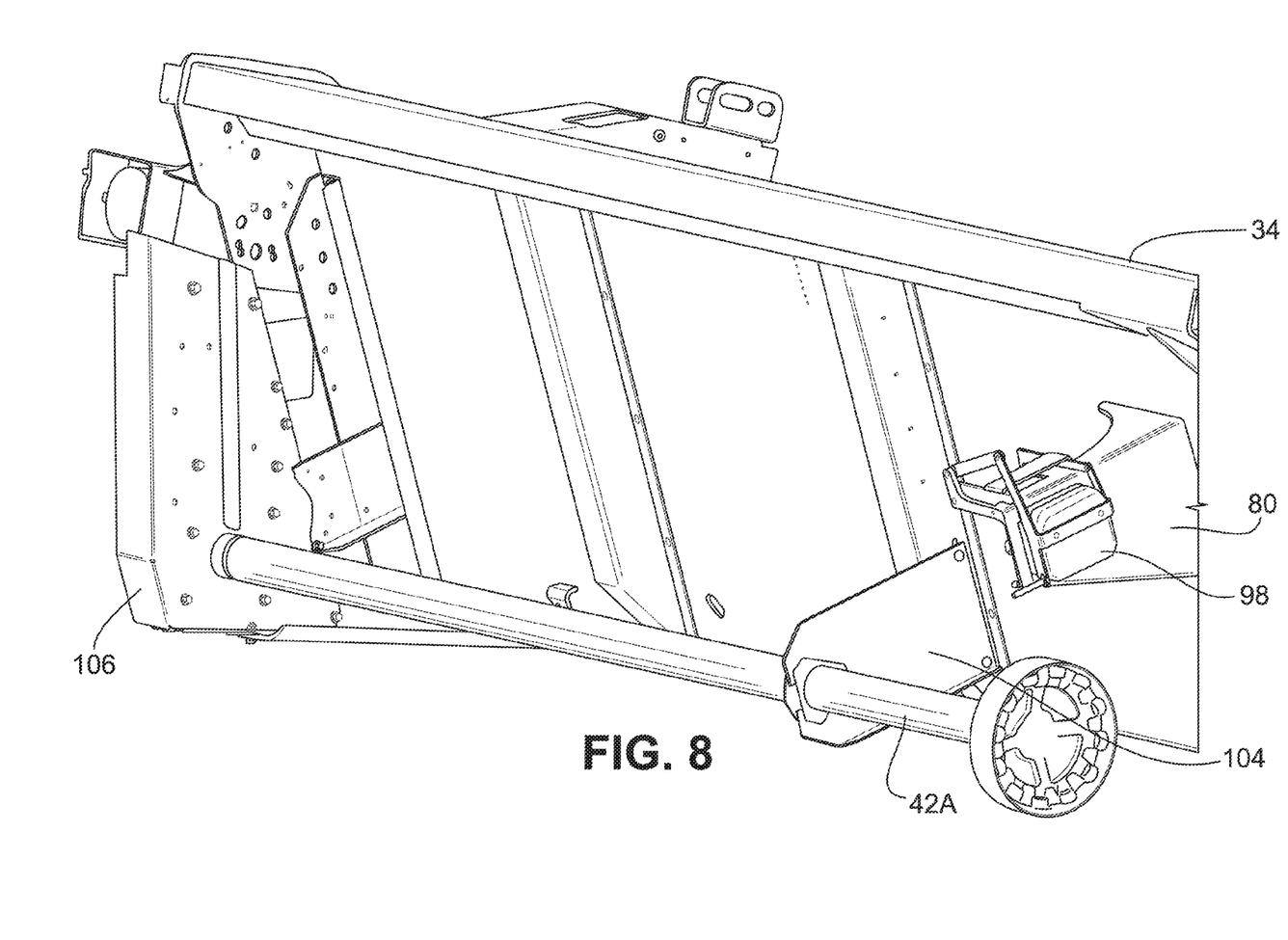
FIG. 8 is a schematic diagram in rear perspective view showing an example header and shaft for an embodiment of an automatic header coupler system.

FIG. 8 depicts an embodiment of a portion of the example header 34 as viewed from the attachment/detachment side. The header 34 comprises previously described components, including the header bracket 80 and the cover 98 depicted in the closed position. The header 34 also includes the shaft 42A, which in the depicted embodiment does not include a U-joint. The shaft 42A is secured to a bracket 104, which is the position and orientation the shaft 42A maintains during coupling with the mechanical and hydraulic components of the feeder house assembly 46 (FIG. 3). The shaft 42A is coupled at the end opposing the combine harvester coupling location to a gearbox 106, which translates rotational movement of the shaft 42A to motion needed to perform header operations as is known.

Figure 9A:
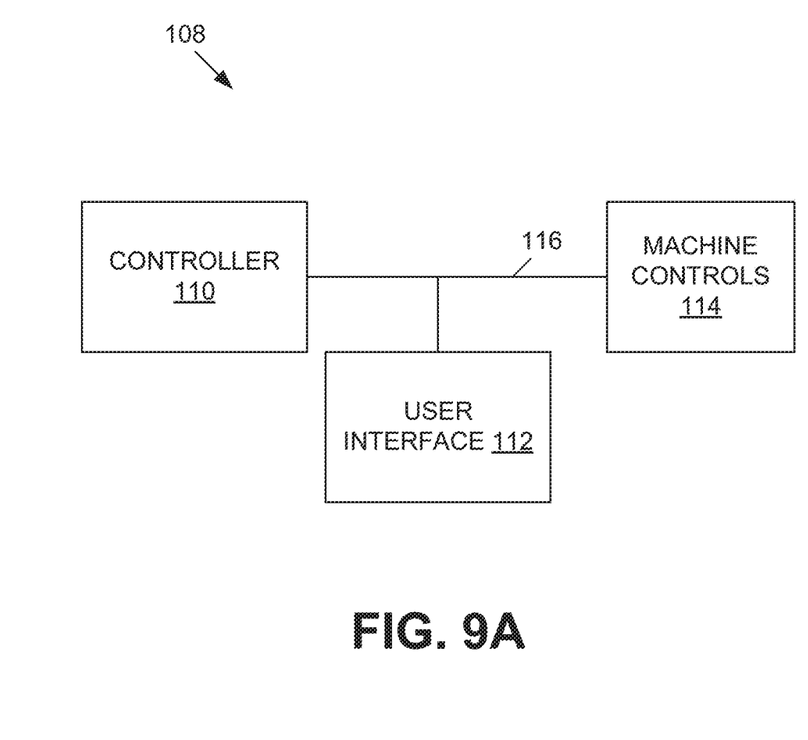
FIGS. 9A-9B are block diagrams that illustrate an embodiment of a control system including a controller for an embodiment of an automatic header coupler system.

FIG. 9A shows an embodiment of a control system 108 for an embodiment of an automatic header coupler system. It should be appreciated within the context of the present disclosure that some embodiments may include additional components or fewer or different components, and that the example depicted in FIG. 9A is merely illustrative of one embodiment among others. For instance, the control system 108 may include guidance devices, telemetry, among other components as should be appreciated by one having ordinary skill in the art in the context of the present disclosure. The control system 108 includes a controller 110, a user interface 112, and machine controls 114, each coupled to one another via a network 116. In some embodiments, multiple controllers 110 may be used. The controller 110 may be coupled in a CAN network 116 (though not limited to a CAN network or a single network) to the user interface 112 and the machine controls 114. The machine controls 114 collectively comprise the various actuators, sensors, cylinders, and/or controlled devices residing on the combine harvester 10 (FIG. 1), including those used to control machine navigation (e.g., speed, direction, etc.), internal machinery operations (e.g., for processing system adjustments, cleaning system adjustments, etc.), feeder house up and down movement, tilt frame rotational movement, actuation of the cylinder 66 (FIG. 4), actuation of the gearbox 60 (FIG. 4), actuation of the electrical/hydraulic apparatus 74 (FIG. 4), among other devices. The user interface 112 may be a keyboard, mouse, microphone, touch-type display device, or other devices (e.g., switches) that enable input by an operator (e.g., such as while in the operator cab 14 (FIG. 1)). In some embodiments, the controller 110 provides for the overall management and control of the control system 108, and in some embodiments, two or more of the components (e.g., separate components of machine controls 114) may communicate with each other (e.g., in peer-to-peer relationship) without intervention by the controller 110. In some embodiments, one or more actions of the feeder house assembly 46 (FIG. 4) may occur transparently to the operator.

In one embodiment, the controller 110 receives input from an operator in the cab 14 (FIG. 1) via the user interface 112, such as to raise or lower the header 34 (FIG. 2), or to perform mechanical and/or hydraulic coupling of the feeder house assembly 46 (FIG. 4), including in some embodiments activating the table locking cylinder 78 (FIG. 4). The signals from the components of the user interface 112 are received by the controller 110, which in turn send signals to the machine controls 114 (e.g., the gearbox 60, FIG. 4) to activate rotational motion of the shaft of the dog clutch 54 (FIG. 4). In some embodiments, the machine controls 114 (e.g., actuation for the gearbox 60) may be activated based on peer-to-peer activation among machine control components (e.g., without controller intervention). For instance, actuation of the gearbox 60 may be triggered by activation of the cylinder 66. In this example, the cylinder 66 may be activated (e.g., an actuator of the cylinder) directly or indirectly by the controller 110 (e.g., based on input by the operator at the user interface 112), and the cylinder 66 causes (without controller intervention) a signal to be provided to the gearbox 60 (e.g., with or without a defined delay relative to activation of the cylinder 66). Other control strategies may be used to activate the mechanical and/or hydraulic coupling mechanisms, as should be appreciated by one having ordinary skill in the art in the context of the present disclosure, and are contemplated to be within the scope of the disclosure.

In some embodiments, an external communication may enable the actuation of mechanical and/or hydraulic coupling mechanisms, such as a remote control from an operator residing in a management office or other facility (e.g., in semi-autonomous or autonomous farming implementations).

Figure 9B:
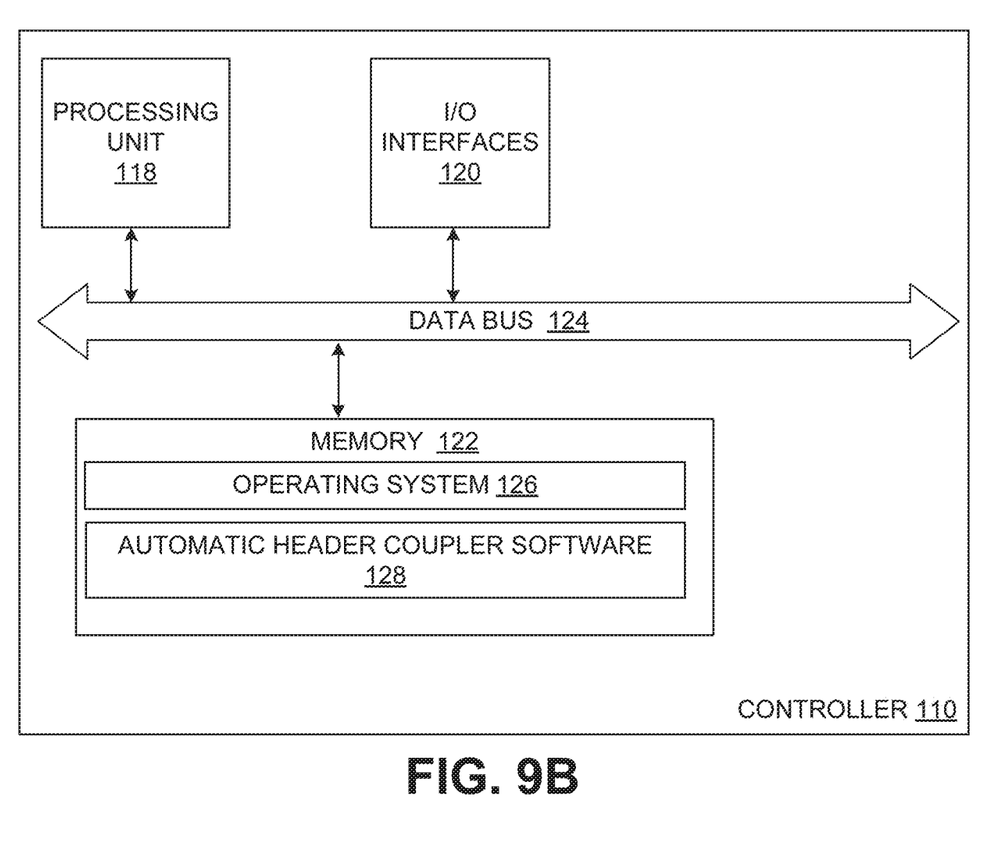

FIG. 9B further illustrates an example embodiment of the controller 110. One having ordinary skill in the art should appreciate in the context of the present disclosure that the example controller 110 is merely illustrative, and that some embodiments of controllers may comprise fewer or additional components, and/or some of the functionality associated with the various components depicted in FIG. 9B may be combined, or further distributed among additional modules, in some embodiments. The controller 110 is depicted in this example as a computer system, but may be embodied as a programmable logic controller (PLC), FPGA, among other devices. It should be appreciated that certain well-known components of computer systems are omitted here to avoid obfuscating relevant features of the controller 110. In one embodiment, the controller 110 comprises one or more processors or processing units, such as processing unit 118, input/output (I/O) interface(s) 120, and memory 122, all coupled to one or more data busses, such as data bus 124. The memory 122 may include any one or a combination of volatile memory elements (e.g., random-access memory RAM, such as DRAM, and SRAM, etc.) and nonvolatile memory elements (e.g., ROM, hard drive, tape, CDROM, etc.). The memory 122 may store a native operating system, one or more native applications, emulation systems, or emulated applications for any of a variety of operating systems and/or emulated hardware platforms, emulated operating systems, etc. In the embodiment depicted in FIG. 9B, the memory 122 comprises an operating system 126 and automatic header coupler software 128. It should be appreciated that in some embodiments, additional or fewer software modules (e.g., combined functionality) may be employed in the memory 122 or additional memory. In some embodiments, a separate storage device may be coupled to the data bus 124, such as a persistent memory (e.g., optical, magnetic, and/or semiconductor memory and associated drives).

With reference to FIGS. 9A and 9B hereinafter, the automatic header coupler software 128 receives information (operator instructions) from the user interface 112 via I/O interfaces 120 and the processing unit 118, and responsively causes execution of the automatic header coupler software 128 (by the processing unit 118) to cause one or more mechanical and/or hydraulic coupling functions to be implemented, which in some embodiments may including positioning the combine harvester 10 (FIG. 1) and/or feeder house 12 (FIG. 3) or tilt frame 44 (FIG. 3) to enable the aforementioned coupling. It should be appreciated that other machine operation software may be included in the memory 122 in some embodiments.

Execution of the automatic header coupler software 128 is implemented by the processing unit 118 under the management and/or control of the operating system 126. In some embodiments, the operating system 126 may be omitted and a more rudimentary manner of control implemented. The processing unit 118 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 110.

The I/O interfaces 120 provide one or more interfaces to the network 116 and other networks. In other words, the I/O interfaces 120 may comprise any number of interfaces for the input and output of signals (e.g., analog or digital data) for conveyance over the network 116. The input may comprise input by an operator (local or remote) through the user interface 112 (e.g., a keyboard or mouse or other input device (or audible input in some embodiments)), and input from signals carrying information from one or more of the components of the combine harvester 10 (FIG. 1), such as machine controls 114, among other devices.

When certain embodiments of the controller 110 are implemented at least in part as software (including firmware), as depicted in FIG. 9B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 110 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 10:
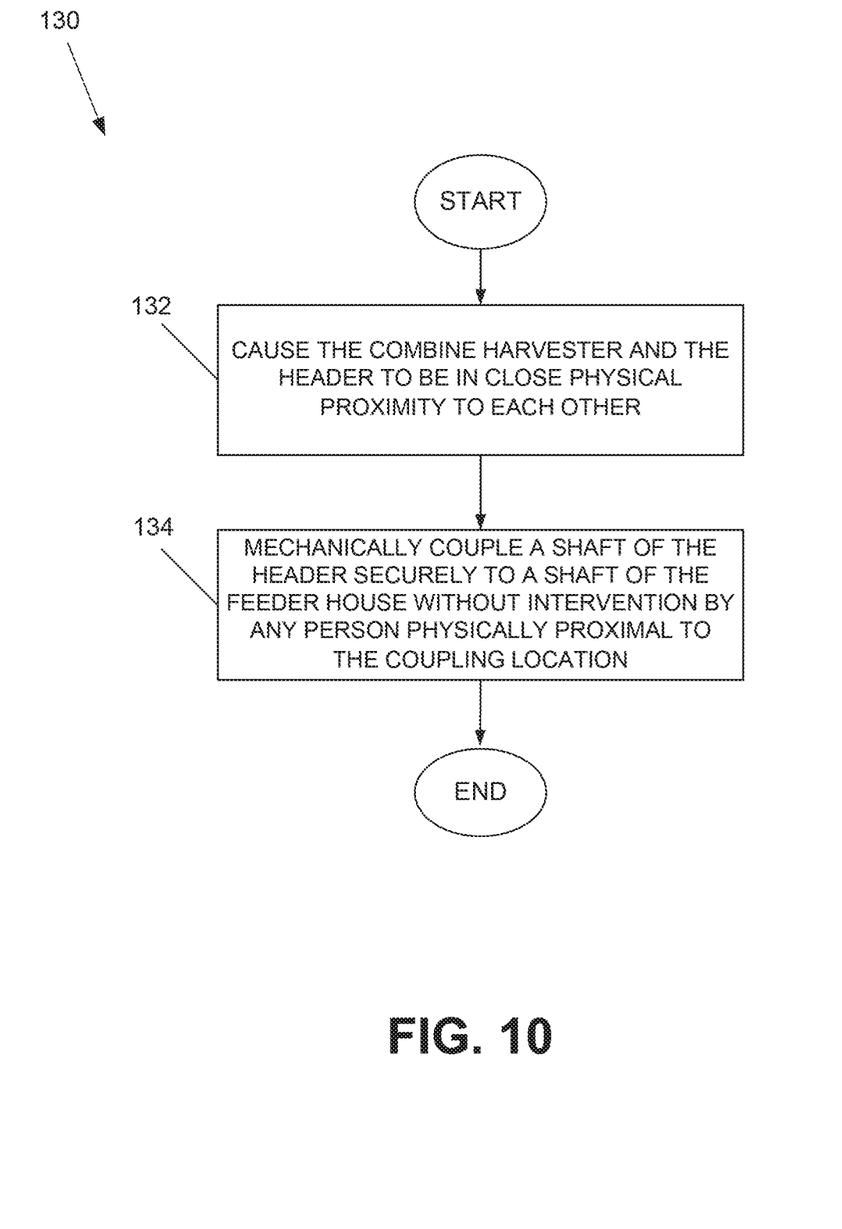
FIG. 10 is a flow diagram that illustrates an example embodiment of an automatic header coupler method.

Having described certain embodiments of an automatic header coupler system, it should be appreciated within the context of the present disclosure that one embodiment of an automatic header coupler method, denoted as method 130 and illustrated in FIG. 10, comprises causing the combine harvester and the header to be in close physical proximity to each other (132); and mechanically coupling a shaft of the header securely to a shaft of the feeder house without intervention by any person physically proximal to the coupling location (134).

Any process descriptions or blocks in flow diagrams should be understood as representing steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A combine harvester feeder house assembly comprising:
    a feeder house comprising an inlet end;
    a tilt frame surrounding the inlet end and in pivotal arrangement relative to the feeder house;
    a gearbox attached to the tilt frame;
    a first dog clutch operably coupled to the gearbox; and
    a quick connect apparatus slidably coupled to a linear guide assembly, the linear guide assembly directly coupled to the tilt frame.

2. The combine harvester feeder house assembly of claim 1, wherein the feeder house comprises a second dog clutch located on a side of the feeder house opposing the first dog clutch, the second dog clutch coupled to the tilt frame.

3. The combine harvester feeder house assembly of claim 1, further comprising an electrical and hydraulic coupler directly coupled to the quick connect apparatus.

4. The combine harvester feeder house assembly of claim 1, further comprising a cylinder that is moveable in a transverse direction and directly coupled to the quick connect apparatus, the quick connect apparatus moveable with the cylinder.

5. The combine harvester feeder house assembly of claim 1, further comprising a cylinder that is moveable in a transverse direction and a bracket that is directly coupled to the cylinder, the quick connect apparatus, and the first dog clutch, wherein the cylinder, the quick connect apparatus, and the first dog clutch are moveable together.

6. The combine harvester feeder house assembly of claim 1, further comprising a cylinder that is moveable in a transverse direction and is directly coupled to the first dog clutch, wherein the first dog clutch and the cylinder are moveable together.

7. The combine harvester feeder house assembly of claim 1, further comprising a remotely actuated table locking cylinder directly coupled to the tilt frame.

8. The combine harvester feeder house assembly of claim 1, wherein the first dog clutch comprises a spring, a spline joint, or a combination of both.

9. A combine harvester and header system, the system comprising:
    a tilt frame in pivotal arrangement relative to a feeder house;
    a gearbox attached to the tilt frame;
    a dog clutch operably coupled to the gearbox;
    a ram sub-assembly and a quick connect apparatus attached to the ram sub-assembly, the ram sub-assembly comprising a cylinder, the cylinder and the quick connect apparatus moveable transversely in tandem; and
    a header, the header comprising a hydraulic apparatus, wherein the quick connect apparatus automatically couples to the hydraulic apparatus based on the transverse movement of the quick connect apparatus, wherein the hydraulic apparatus comprises a hinged cover and the quick connect apparatus comprises a pivotal cover, the hinged cover and the pivotal cover opened responsive to the transverse movements of the ram sub-assembly and the quick connect apparatus.

10. The system of claim 9, the header further comprising a shaft that couples to the dog clutch without an intervening U-joint.

11. The system of claim 10, further comprising a controller, the controller configured to cause mechanical coupling between the dog clutch and the shaft without intervention by any person located proximal to the coupling location.

12. The system of claim 9, wherein the ram sub-assembly further comprises a bracket, the bracket directly coupled to the dog clutch and to the quick connect apparatus, wherein the cylinder, the bracket, the quick connect apparatus, and the dog clutch are moveable transversely in tandem.

13. The system of claim 9, wherein the cylinder is coupled to the dog clutch, and the cylinder and the dog clutch are moveable transversely in tandem.

14. The system of claim 9, the header further comprising a shaft that couples to the dog clutch using an intervening U-joint, wherein the dog clutch comprises a spline that enables coupling between the U-joint and the dog clutch.

* * * * *